(12) United States Patent
Rentschler et al.

(10) Patent No.: US 8,566,645 B2
(45) Date of Patent: Oct. 22, 2013

(54) DEBUG STATE MACHINE AND PROCESSOR INCLUDING THE SAME

(75) Inventors: Eric Rentschler, Steamboat Springs, CO (US); Steven J. Kommrusch, Fort Collins, CO (US); Scott P. Nixon, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 348 days.

(21) Appl. No.: 12/958,585

(22) Filed: Dec. 2, 2010

(65) Prior Publication Data

US 2012/0144240 A1   Jun. 7, 2012

(51) Int. Cl.
*G06F 11/00* (2006.01)

(52) U.S. Cl.
USPC ............................................................ 714/34

(58) Field of Classification Search
USPC .......... 714/34, 35, 37, 38.1, 38.11, 38.13, 39, 714/45, 47.1, 48, 49–51, 738
See application file for complete search history.

(56) References Cited

U.S. PATENT DOCUMENTS

| | | | | |
|---|---|---|---|---|
| 5,771,240 | A * | 6/1998 | Tobin et al. | 714/724 |
| 6,502,210 | B1 * | 12/2002 | Edwards | 714/38.12 |
| 7,013,409 | B2 * | 3/2006 | Gergen et al. | 714/34 |
| 7,107,489 | B2 * | 9/2006 | Gergen et al. | 714/30 |
| 7,613,955 | B2 * | 11/2009 | Arnold | 714/38.14 |
| 7,770,073 | B2 * | 8/2010 | Fashchik et al. | 714/48 |
| 2004/0250164 | A1 * | 12/2004 | Ahmad et al. | 714/30 |
| 2055/0034017 | | 2/2005 | Airaud et al. | |
| 2006/0150023 | A1 * | 7/2006 | Hasebe et al. | 714/38 |
| 2007/0079288 | A1 | 4/2007 | Willwerth et al. | |
| 2012/0185730 | A1 * | 7/2012 | Moran et al. | 714/37 |

* cited by examiner

*Primary Examiner* — Nadeem Iqbal
(74) *Attorney, Agent, or Firm* — Volpe and Koenig, P.C.

(57) ABSTRACT

A processor or an integrated circuit chip including a debug state machine (DSM) that allows for programming complex triggering sequences for flexible and efficient debug visibility is disclosed. The DSM centralizes control of local debug functions such as trace start and stop, trace filtering, cross triggering between DSMs, clock stopping, triggering a system debug mode interrupt, flexible microcode interface, and the like. The DSM is configured to receive triggers from a processor core, other DSMs, a northbridge, other sockets, and the like and initiate a programmed action on a condition that a corresponding trigger or a sequence of triggers occurs.

20 Claims, 7 Drawing Sheets

DEBUG STATE MACHINE AND PROCESSOR INCLUDING THE SAME

FIELD OF INVENTION

This application is related to a processor or an integrated circuit chip including, but not limited to, microprocessors, central processing units (CPUs), graphical processing units (GPUs), and the like.

BACKGROUND

After the design of an integrated circuit (IC) or a system including multiple ICs, the design needs to be verified for correct operations. With the evolution of processing technologies and reduction of size and increase in complexity of devices, debugging of the complex circuit designs has become more and more difficult to perform using traditional simulation tools and techniques.

When an error is detected during debugging, designers may attempt to tap signals of interest from the circuit and use a logic analyzer to determine the cause of the error. However, this is a difficult process and is often not effective. Errors that have already occurred are often difficult to repeat and reconstruct. Therefore, it would be desirable to provide more efficient debugging capabilities.

SUMMARY OF EMBODIMENTS

A processor or an integrated circuit chip including a debug state machine (DSM) that allows for programming complex triggering sequences for flexible and efficient debug visibility is disclosed. The DSM centralizes control of local debug functions such as trace start and stop, trace filtering, cross triggering between DSMs, clock stopping, triggering a system debug mode interrupt, flexible microcode interface, and the like. The DSM is configured to receive triggers from a processor core, other DSMs, a northbridge, other sockets, and the like and initiate a programmed action on a condition that a corresponding trigger or a sequence of triggers occurs.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

In accordance with one embodiment, a processor or an integrated circuit chip includes a debug state machine (DSM) that allows for programming complex triggering sequences for flexible and efficient debug visibility. The DSM centralizes control of local debug functions such as trace start and stop, trace filtering, cross triggering between DSMs, clock stopping, triggering a hardware debug tool (HDT) interrupt, flexible microcode interface, and the like.

Figure 1:
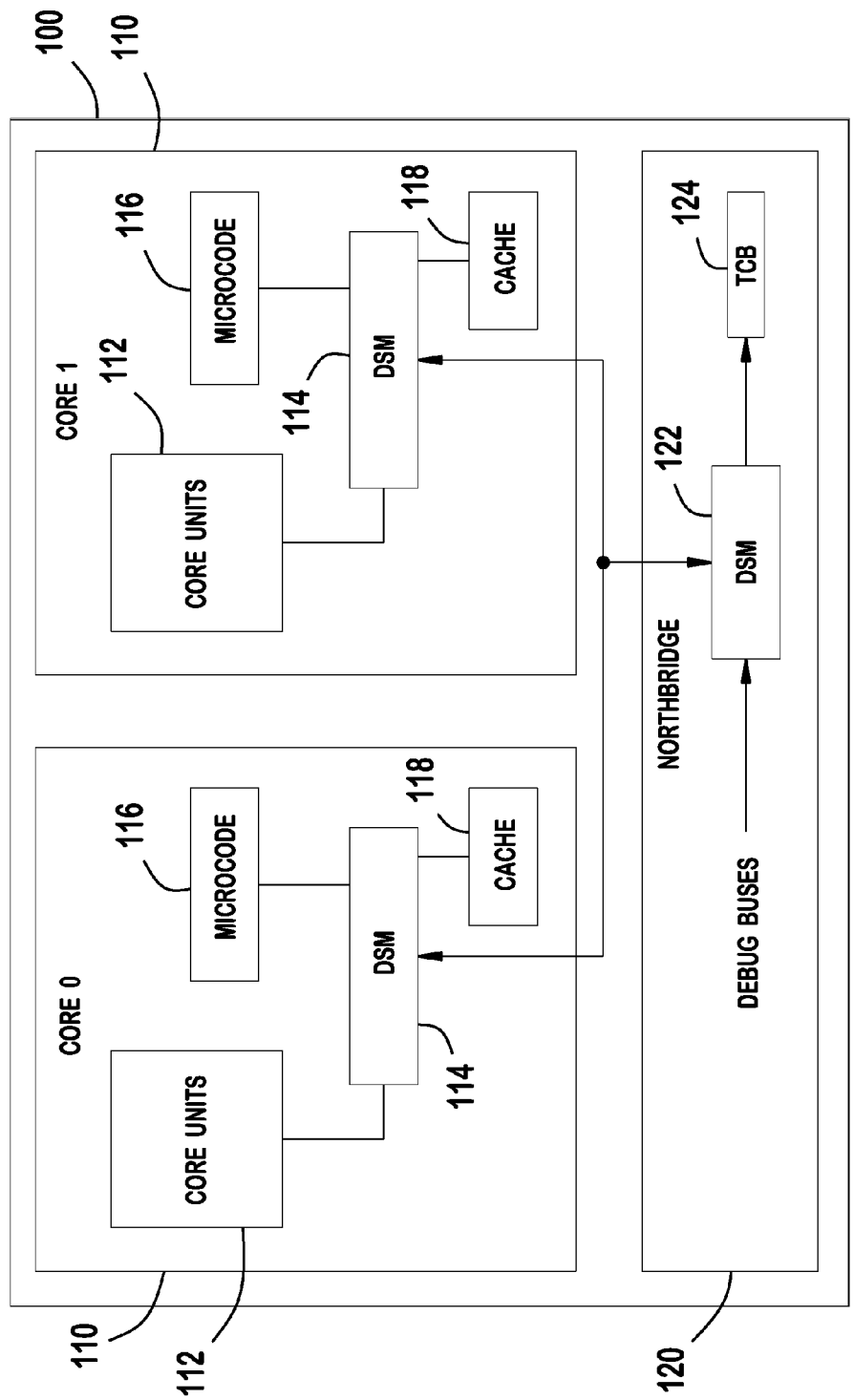
FIG. 1 shows an example processor including a debug state machine (DSM) in accordance with one embodiment.

FIG. 1 shows an example processor 100 including a DSM in accordance with one embodiment. The processor 100 in FIG. 1 includes two cores 110 and a northbridge 120. Each core 110 may include core units 112, a DSM 114, a microcode 116, and a cache 118. The northbridge 120 may include a DSM 122 and a trace cache buffer (TCB) 124. The TCB 124 is a dedicated array for storing the trace data. The DSM 114 in each core receives triggers from the core, other DSMs, the northbridge, and/or other sockets, etc., and performs specific actions. The actions include, but are not limited to, stopping a clock, entering a debug mode, issuing a debug cross trigger, start or stop storing information to a storage unit, (e.g., the cache 118 or the TCB 124), transitioning a particular debug state, incrementing or clearing a counter, setting or clearing a flag in a register, or the like, which will be explained in detail below.

It should be noted that the processor structure shown in FIG. 1 is an example, and any variations are possible. For example, the processor 100 may include one core or more than two cores, and may or may not include a northbridge 120, and the northbridge 120 may or may not include a DSM 114. The DSM 114 may be utilized in any type of processor or chipset such as a central processing unit (CPU), a graphics processing unit (GPU), a southbridge, a northbridge, or the like.

Figure 2:
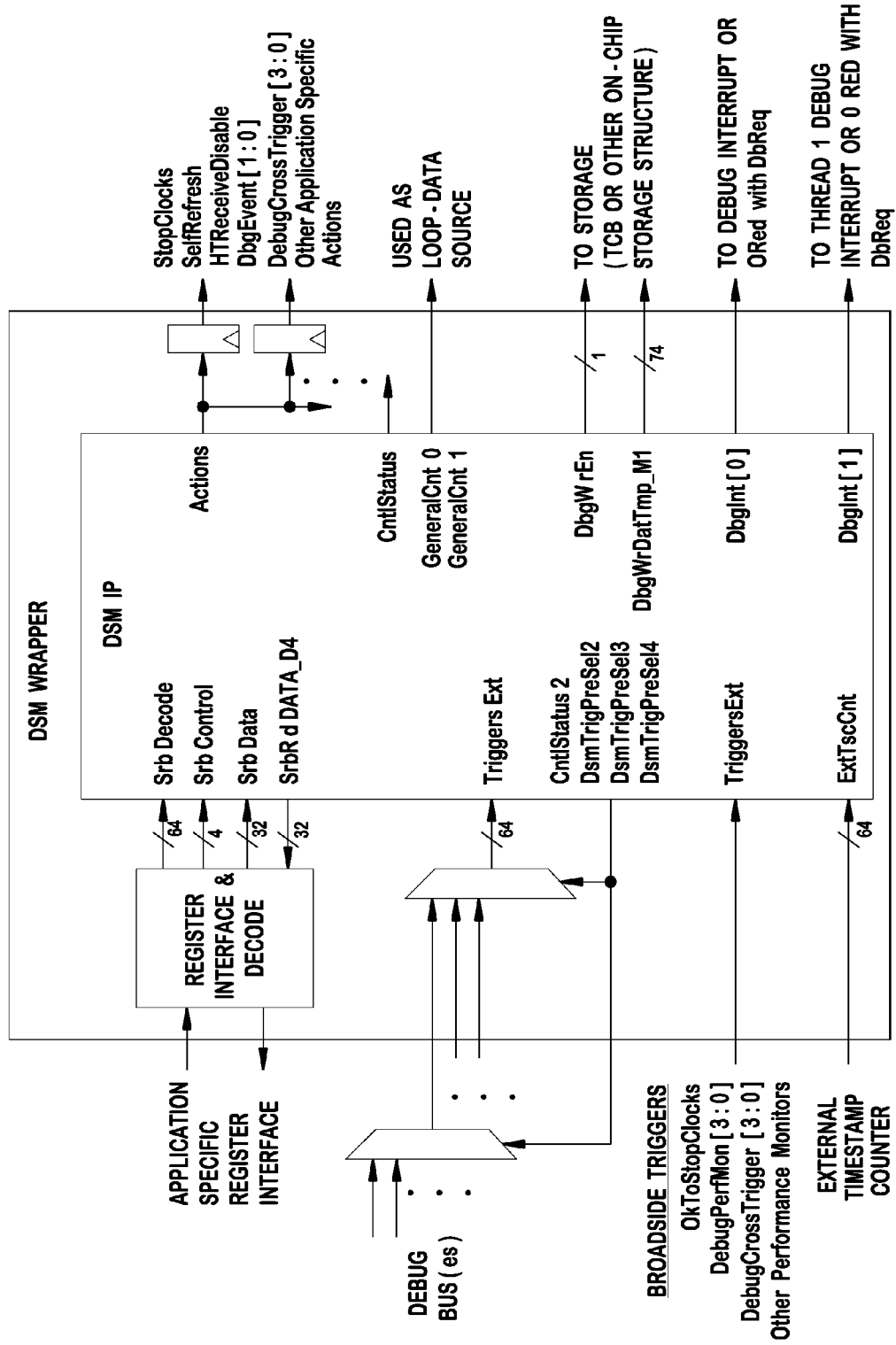
FIG. 2 shows an example DSM interfaces.

FIG. 2 shows an example DSM interface. The DSM 114 may have interfaces for clock signals, triggers, actions, special register bus (SRB) accesses, an external timestamp counter, control and status registers, debug interrupts, debug bus interfaces, general counters, control signals, etc. Table 1 shows example DSM interfaces that may be provided for the DSM 114. The DSM 114 may have all or a subset of the interfaces listed in Table 1 depending on the application.

TABLE 1

| Signal Name | I/O | Comments |
|---|---|---|
| | | CPL |
| CCLK | I | Global Clock |
| SC1 | I | Scan clock 1 |
| SC2 | I | Scan clock 2 |
| R | I | Reset |
| ScanShiftEn | I | Enable for scan shift mode |
| ClockGater | I | Clock gater input. |
| | | Triggers |
| TriggersExt | I | Triggers inbound to the DSM. |
| | | Actions |
| Actions | O | Actions outbound from the DSM. |
| | | SRB Access |
| RegDat | I | Write Data for DSM registers. |
| RegWrEnLo | I | Write signal for lower 32 bits. |
| RegWrEnHi | I | Write signal for upper 32 bits. |
| RegRdEn | I | Read select signal. 0: lower 32 bits, 1: upper 32 bits. |
| RegAccessGater | I | Flop gating for read return path flops. This signal is generated in the wrapper and is passed into the DSM for reducing CAC. |
| RegDecode | I | One-hot bus that is a decode for each DSM register access. The decoding is performed within the DSM wrapper such that each application can do its own debug. |
| RegRdData | O | Read-return data from the DSM. |

TABLE 1-continued

| Signal Name | I/O | Comments |
|---|---|---|
| | | External Timestamp Counter |
| ExtTscCnt | I | External timestamp counter input. The DSM may use its own internal timestamp counter or an external source. |
| | | Control and Status Registers |
| CntlStatus | O | Main control register for the DSM. |
| CntlStatus2 | O | Application specific control register for the DSM. |
| | | Miscellaneous Wrapper Control |
| DsmTrigPreSel2 | O | Additional application specific control |
| DsmTrigPreSel3 | O | register for the DSM. |
| DsmTrigPreSel4 | O | |
| | | Debug Interrupt(s) |
| DbgInt[0] | O | Debug interrupt signal. |
| DbgInt[1] | O | Debug interrupt signal. |
| | | Debug Bus Interface |
| DebugBusIn | I | Debug bus input port. |
| DebugTraceWrEn | O | |
| DebugTraceWrData | O | |
| | | General Counters |
| GeneralCnt0 | O | May be used as source data to place onto the |
| GeneralCnt1 | O | debug bus in a wrap-around mode to use for continuity testing. |

The processor 100 may support scan capability such that the state of the processor arrays may be accessed by stopping clocks and scanning out through the scan ports. The scan clock has a separate set of pins (SC1 and SC2).

The triggers interface (TriggersExt) is for inbound triggers to the DSM 114 from the debug buses and broadside triggers. The broadside triggers include a signal to stop clock signals (OKToStopClocks), performance monitors, errors, breakpoints, cross-triggers from other DSM(s), etc.

The actions interface (Actions) is for an outbound signal from the DSM for a specific action based on a trigger or a sequence of triggers.

The SRB access interfaces (RegDat, RegWrEn, RegAccessGater, RegDecode, RegRdData) are provided for reading and writing data from and to the DSM registers.

The DSM may use its own internal timestamp counter. Alternatively, the DSM may have an interface for an external timestamp counter input (ExtTscCnt) so that a global timestamp may be used across all DSMs.

The control and status registers (CntlStatus, CntlStatus2, DsmTrigPreSel*) are for controlling the DSM.

The debug interrupt interfaces (DbgInt) are for interrupting the microcode, etc., and may be ORed with the conventional debug request signal or may form a dedicated debug interrupt signal.

The debug bus interfaces (DebugBusIn, DebugTraceWrEn, DebugTraceWrData) are for controlling and sending debug information to a storage unit, (e.g., cache 118 or TCB 124).

Figure 3:
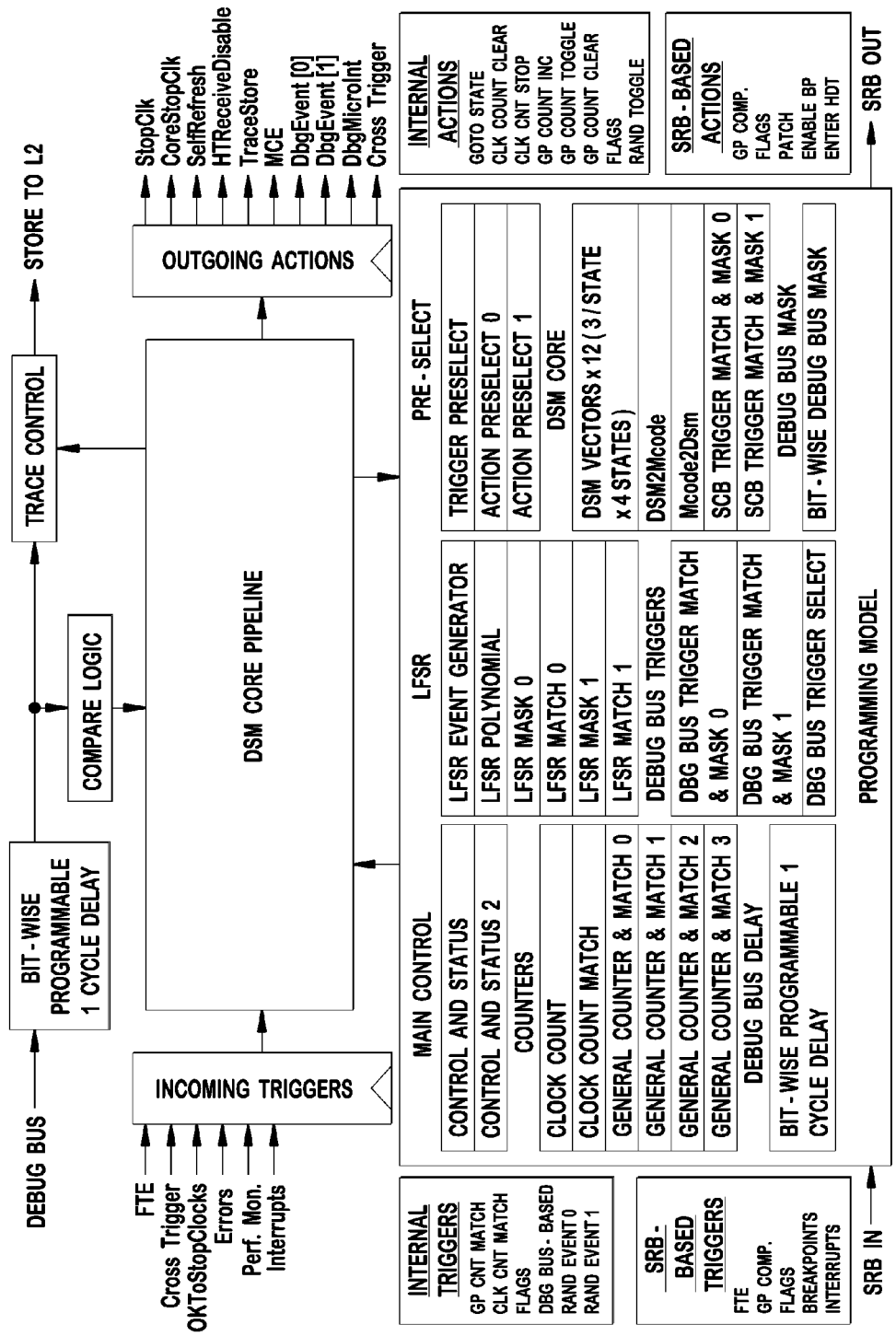
FIG. 3 shows an example programming model of the DSM.

Example programming of the DSM 114 will be explained hereafter. FIG. 3 shows an example programming model of the DSM 114. The DSM 114 receives triggers from the core, the northbridge, other DSMs, or other sockets, etc., and performs certain actions. The DSM 114 may include control and status registers, counters, a linear feedback shift register (LSFR), registers for debug bus triggers, registers for preselect triggers and pre-select actions, registers for the DSM core, a debug bus mask register, and the like, which will be explained in detail below. The DSM actions may be programmed in any manner to perform a specific action(s) in response to a specific trigger(s).

Figure 4:
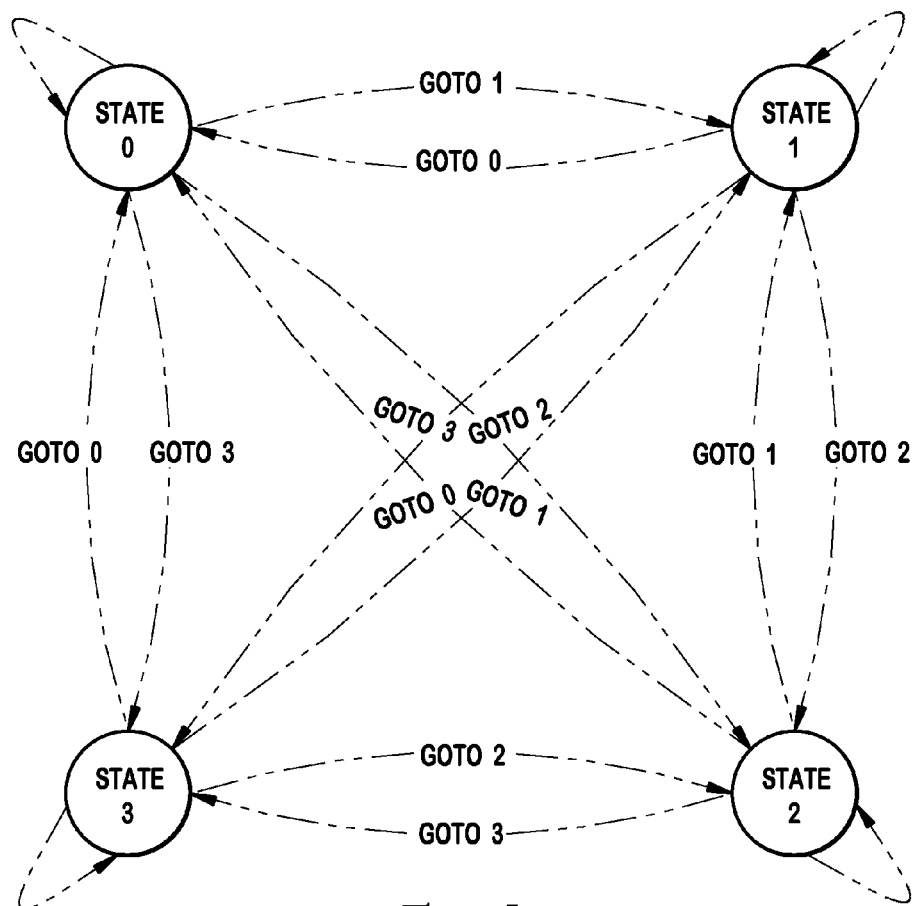
FIG. 4 shows an example DSM state diagram.

FIG. 4 shows an example DSM state diagram. As an example, four states may be defined for the DSM 114. It should be noted that the four states are provided as an example, and any arbitrary number of states may be defined. The DSM state may transition from one state to another as an action triggered by a specific trigger.

Figure 5A:
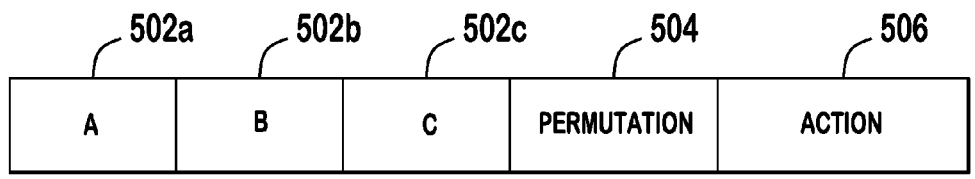
FIG. 5(A) shows a meta-vector which is held by the DSM vector registers.

The DSM 114 may be programmed via the special register bus (SRB). To program the DSM 114, a plurality of meta-vectors may be defined for each of a plurality of DSM states. For example, three 42 bit meta-vectors may be defined for each of the four DSM states. FIG. 5(A) shows a meta-vector 500 which is held by the DSM vector registers (dsm_sm_vec). A meta-vector 500 may include one or more trigger fields 502a, 502b, 502c (three trigger fields A, B, and C in this example), a permutation field 504, and an action field 506. Each of the meta-vectors may be sensitive to up to a predetermined number of triggers, (e.g., three in this example). It should be noted that the meta-vector 500 may be programmed to be sensitive to any number of triggers. The trigger fields 502a-502c select triggers. The permutation field 504 combines any Boolean combination of the three triggers for that meta-vector. The permutation field 504 defines whether the conditions for that meta-vector have been met. If so, the actions specified by the action field 506 are invoked.

Figure 5B:
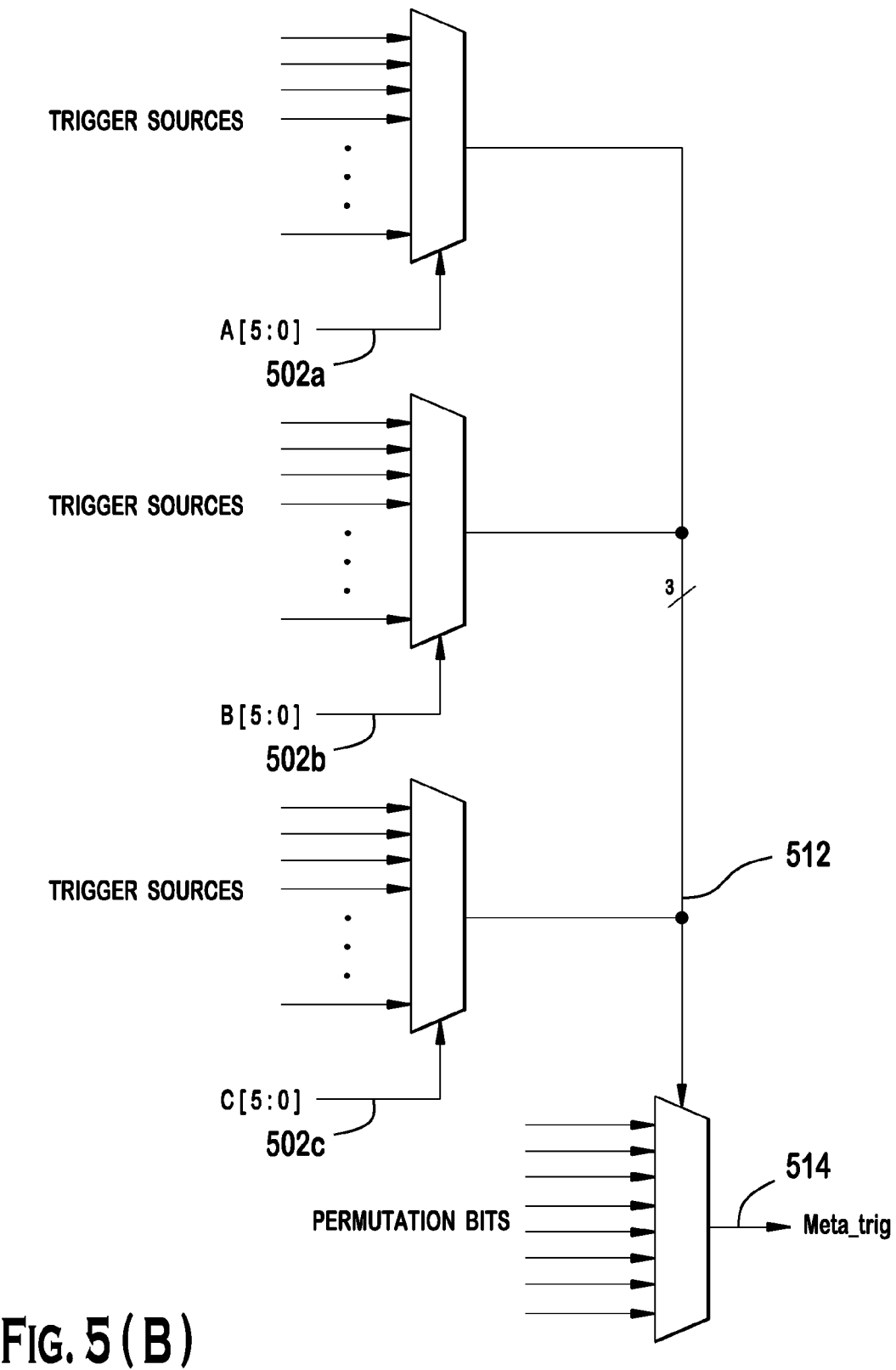
FIG. 5(B) shows DSM programming via the meta-vectors.

FIG. 5(B) shows DSM programming via the meta-vectors 500. Each trigger field A, B, and C 502a-502c selects a trigger from all possible trigger sources, respectively, generating three bit action signals 512. One of the permutation bits is selected as a meta trigger (meta_trig) 514 based on the three bit action signals 512. If the meta-trigger 514 is true, the actions defined by the action field 506 will take effect.

Table 2 shows an example permutation field programming as a function of the triggers. For example, if the action is programmed to be triggered when a trigger A occurs regardless of triggers B and C, the permutation field may be set to 0xAA. If the action is programmed to be triggered when a trigger A XOR B is true, the permutation field may be set to 0x66.

TABLE 2

| Permutation bits | Action fields | | | Trigger permutation programming A | | | | |
|---|---|---|---|---|---|---|---|---|
| | C | B | A | A | B | C | XOR B | A&~B|~A&C |
| 0 | 0 | 0 | 0 | 0 | 0 | 0 | 0 | 0 |
| 1 | 0 | 0 | 1 | 1 | 0 | 0 | 1 | 1 |
| 2 | 0 | 1 | 0 | 0 | 1 | 0 | 1 | 0 |
| 3 | 0 | 1 | 1 | 1 | 1 | 0 | 0 | 0 |
| 4 | 1 | 0 | 0 | 0 | 0 | 1 | 0 | 1 |
| 5 | 1 | 0 | 1 | 1 | 0 | 1 | 1 | 1 |
| 6 | 1 | 1 | 0 | 0 | 1 | 1 | 1 | 1 |
| 7 | 1 | 1 | 1 | 1 | 1 | 1 | 0 | 0 |
| Permutation field | | | | 0xAA | 0xCC | 0xF0 | 0x66 | 0x72 |

Triggers are explained hereafter. The DSM receives triggers from the core, the northbridge, the microcode, other DSMs, other sockets, or the like, and performs a certain action(s). The triggers include, but are not limited to, general count match triggers, clock count match triggers, flags, debug-bus based triggers, random events, performance monitors, interrupts, errors, OKToStopClock signal, cross triggers, breakpoints, and/or general comparison-based triggers, etc. Table 3 lists example triggers from the core and the northbridge.

TABLE 3

| Category | Name | Comments |
|---|---|---|
| Count Match Triggers | trig_gen_cnt_0<br>trig_gen_cnt_1<br>trig_gen_cnt_2<br>trig_gen_cnt_3<br>trig_clk_cnt | General counter 0 match trigger.<br>General counter 1 match trigger.<br>General counter 2 match trigger.<br>General counter 3 match trigger.<br>Clock counter match trigger |
| Constant 1 | "true" | Simply a constant input of 1. This may be included for programming simplicity. |
| Misc. Debug Data-Based Triggers | Trig_misc_eq[0]<br>Trig_misc_eq[1] | These triggers are derived from the miscellaneous trace data that comes from the various core units. This trigger fires if the values are equal. |
| | Trig_misc_gt[0]<br>Trig_misc_gt[1] | These triggers are derived from the miscellaneous trace data that comes from the various core units. This trigger fires if the values greater than the compare value. |
| | BusBitTrig0<br>BusBitTrig1<br>BusBitTrig2<br>BusBitTrig3 | Debug bus based trigger. This is a bit selected from the 64 bit debug bus. |
| | DbgBusChng | Indicates that at least one bit on the debug bus changed relative to its value the prior clock cycle. |
| Random Event | rand_event0<br>rand_event1 | This trigger fires as a function of the seed, polynomial, mask and match registers. |
| DSM flags | C1_Flagout<br>C0_Flagout | State of DSM2mcode flagout1 bit.<br>State of DSM2mcode flagout0 bit. |
| Microcode Triggers | Ucode0<br>Ucode1<br>Ucode2<br>Ucode3<br>Ucode4<br>Ucode5<br>Ucode6<br>Ucode7<br>Ucode8<br>Ucode9<br>Ucode10<br>Ucode11 | These triggers are defined in a separate register. They may be fixed for an entire debug run and apply to all DSM states. |
| Additional Misc. Debug Data-Based Triggers | Trig_misc_eq_lo16[0] | This trigger represents the equality of the lower 16 bits of the Trig_misc_eq[0] trigger. |
| | Trig_misc_eq_hi16[0] | This trigger represents the equality of the upper 16 bits of the Trig_misc_eq[0] trigger. |
| | Trig_misc_eq_lo16[1] | This trigger represents the equality of the lower 16 bits of the Trig_misc_eq[1] trigger. |
| | Trig_misc_eq_hi16[1] | This trigger represents the equality of the upper 16 bits of the Trig_misc_eq[1] trigger. |
| Additional Count Match Triggers | trig_eq_cnt1_cnt0 | Trigger to indicate that counter 1 is equal to counter 0. Useful for tracking allocate/de-allocate type functions. Set trig_gen_cnt1 to a threshold value. Increment trig_gen_cnt0 upon an allocate. Increment trig_gen_cnt1 upon a deallocate. This trigger will fire if the threshold is set. |
| | trig_eq_cnt3_cnt2 | Trigger to indicate that counter 3 is equal to counter 2. Useful for tracking allocate/de-allocate type functions. Set trig_gen_cnt3 to a threshold value. Increment trig_gen_cnt2 upon an allocate. Increment trig_gen_cnt3 upon a deallocate. This trigger will fire if the threshold is set. |

The count match triggers are generated when a counter (general counter, clock counter, etc.) matches a match value. The debug data-based triggers are derived from the miscellaneous trace data that comes from the various core units via the debug bus. The debug data-based triggers may be generated if the values, (either all or a subset of the values (e.g., upper or lower 32 bits)), are equal to, and/or greater than or less than, a comparison value (or based on any other logical or arithmetic operations). The debug data-based triggers may be a bit selected from the debug bus. The debug data-based trigger signal may indicate that at least one bit on the debug bus changed relative to its value in the prior clock cycle.

The random event trigger, which will be explained below, fires as a function of the seed, polynomial, mask, and/or match registers. The microcode may trigger a certain DSM action. The microcode triggers may be statically defined in a separate register, and may be fixed for an entire debug run and applied to all DSM states. Additional count match triggers indicate that a counter is equal to another counter. This may be useful for tracking allocate/de-allocate type functions. For example, trig_gen_cnt1 may be set to a threshold value, and trig_gen_cnt0 may be incremented upon an allocate and trig_gen_cnt1 may be incremented upon a de-allocate, and this trigger will fire if the threshold is met.

The pre-selected triggers (microcode triggers in Table 3) are the triggers in the following families: breakpoints, interrupts, performance monitors, and error events, or the like.

The DSM may use the conventional breakpoint conditions as triggers. The DSM overrides the breakpoint as the conventional breakpoints are disabled through the microcode. When the breakpoint handling microcode begins to execute, it reads the value of a bit in the dsm2mcode register, (the register for communication from the DSM to the microcode). If the bit is true, the microcode signals the type of breakpoint that it hit by setting the corresponding bit in a register, and returns without taking the breakpoint.

The DSM may trigger on I/O instructions as specified in the system management mode (SMM) I/O trap offset register. Similar to the breakpoint triggers, the SMM IO trap may not take place as normal.

The DSM may use the performance monitor signals as events to trigger from. Events selected from existing performance monitor event select capabilities are routed to the DSM as a trigger. The DSM can then treat the performance monitor events as triggers and may be programmed to react to a combination or sequence of them.

Each pre-selected trigger may be made up of two fields. The first field is a cluster-agnostic selection encoding and the second field determines which cluster or an OR of both clusters, as shown in Table 6. The second field programs how each cluster's version of the trigger is used to form what the DSM actually sees. Using both of these fields, for each trigger, the DSM may look at one core or the other cluster's version, or it may look at the OR of either cluster's version. Tables 4 and 5 show example dsm_trig_pre_sel1 and dsm_trig_pre_sel2 register bit field definitions.

TABLE 4

| Width | Bits | Access | Reset | Name | Description |
|---|---|---|---|---|---|
| 1 | 63 | r/w | 0x0 | Reserved | |
| 5 | 62:58 | r/w | 0x0 | UcodePreSel8[4:0] | Ucode Select 8 |
| 2 | 57:56 | r/w | 0x3 | UcodePreSel8C[1:0] | |

TABLE 4-continued

| Width | Bits | Access | Reset | Name | Description |
|---|---|---|---|---|---|
| 5 | 55:51 | r/w | 0x0 | UcodePreSel7[4:0] | Ucode Select 7 |
| 2 | 50:49 | r/w | 0x3 | UcodePreSel7C[1:0] | |
| 5 | 48:44 | r/w | 0x0 | UcodePreSel6[4:0] | Ucode Select 6 |
| 2 | 43:42 | r/w | 0x3 | UcodePreSel6C[1:0] | |
| 5 | 41:37 | r/w | 0x0 | UcodePreSel5[4:0] | Ucode Select 5 |
| 2 | 36:35 | r/w | 0x3 | UcodePreSel5C[1:0] | |
| 5 | 34:30 | r/w | 0x0 | UcodePreSel4[4:0] | Ucode Select 4 |
| 2 | 29:28 | r/w | 0x3 | UcodePreSel4C[1:0] | |
| 5 | 27:23 | r/w | 0x0 | UcodePreSel3[4:0] | Ucode Select 3 |
| 2 | 22:21 | r/w | 0x3 | UcodePreSel3C[1:0] | |
| 5 | 20:16 | r/w | 0x0 | UcodePreSel2[4:0] | Ucode Select 2 |
| 2 | 15:14 | r/w | 0x3 | UcodePreSel2C[1:0] | |
| 5 | 13:9 | r/w | 0x0 | UcodePreSel1[4:0] | Ucode Select 1 |
| 2 | 8:7 | r/w | 0x3 | UcodePreSel1C[1:0] | |
| 5 | 6:2 | r/w | 0x0 | UcodePreSel0[4:0] | Ucode Select 0 |
| 2 | 1:0 | r/w | 0x3 | UcodePreSel0C[1:0] | |

TABLE 5

| Width | Bits | Access | Reset | Name | Description |
|---|---|---|---|---|---|
| 43 | 63:21 | r/w | 0x0 | Reserved | |
| 5 | 20:16 | r/w | 0x0 | UcodePreSel11[4:0] | Ucode Select 11 |
| 2 | 15:14 | r/w | 0x3 | UcodePreSel11C[1:0] | |
| 5 | 13:9 | r/w | 0x0 | UcodePreSel10[4:0] | Ucode Select 10 |
| 2 | 8:7 | r/w | 0x3 | UcodePreSel10C[1:0] | |
| 5 | 6:2 | r/w | 0x0 | UcodePreSel9[4:0] | Ucode Select 9 |
| 2 | 1:0 | r/w | 0x3 | UcodePreSel9C[1:0] | |

TABLE 6

| *C[1:0] Field | Overall Trigger (seen by DSM) | Comments |
|---|---|---|
| 0x0 | Undefined | |
| 0x1 | Cluster 0 only | |
| 0x2 | Cluster 1 only | |
| 0x3 | Cluster 0 OR cluster 1 | This may be the reset value. |

Table 7 defines the example microcode triggers for each of the UcodePreSel*[4:0] fields of Tables 4 and 5 in order to select any of the interrupt triggers.

TABLE 7

| Signal Name | Comments |
|---|---|
| EnterAPml | |
| ICIBS | These interrupt events are detailed |
| VINTR | in the Mcode2Dsm register. |
| A20MASK | |
| STDATDBG | |
| STARTUP | |
| EnterDbgMode | |
| MACHCHK | |
| NSSBSS | |
| SMI | |
| INIT | |
| NMI | |
| INTR | |
| STPCLK | |
| STARTCLK | |
| int3 | |
| int | |
| BpTaskSw | Task switch breakpoint from microcode. |
| BpGenDet | General detect breakpoint from microcode. |
| BpWrMsr | WRMSR breakpoint from microcode. |
| BpCpuId | CPUID breakpoint from microcode. |
| BpExcpBp | Exception breakpoint from microcode. |
| BpVmExit | VMEXIT breakpoint from microcode. |
| UcodeCmpFalse | Microcode comparison result triggers. |
| UcodeCmpTrue | |
| FteOpcode0 | Microcode-based fast trap and emulate triggers. |
| FteOpcode1 | |
| flagin | Flagin bit from microcode. |
| PatchClear | Trigger to indicate that microcode cleared the patch bit in mcode2dsm. |
| EnblBpClear | Trigger to indicate that microcode cleared the EnblBp bit in mcode2dsm. |
| EnterHdtClear | Trigger to indicate that microcode cleared the EnterHdt bit in mcode2dsm. |
| EnterRmtApmlClear | Trigger to indicate that microcode cleared the EnterApml bit in mcode2dsm. |

DSM actions are explained hereafter. The DSM performs a specific action based on a trigger or a sequence of triggers. Actions may be categorized into two categories: main actions and pre-selected actions. As an example, 16 main actions and 46 pre-selected actions are defined below. The main actions are actions that may cause a trigger that feeds back to the DSM. Among the 16 main actions, 12 real main actions and four general actions are defined as an example herein. The four general actions (Gen_act0-3) are a level of indirection where these are pre-selected outside the tight loop that the 12 real main actions feed back. This allows for pipelining of the general actions. The action field in the meta-vector in FIG. 5(A) is a 16 bit fully decoded field. This allows firing any permutation of the 16 general actions. Table 8 shows the example 16 main actions.

TABLE 8

| Signal | Action Bit Position(15:0) | Comments |
|---|---|---|
| Goto_state_0 | 0 | Action to goto state 0. When there is a conflict in programming where multiple Goto_state_* actions are fired, the lowest Goto_state_* takes priority. |
| Goto_state_1 | 1 | Action to goto state 1. When there is a conflict in programming where multiple Goto_state_* actions are fired, the lowest Goto_state_* takes priority. |
| Goto_state_2 | 2 | Action to goto state 2. When there is a conflict in programming where multiple Goto_state_* actions are fired, the lowest Goto_state_* takes priority. |

TABLE 8-continued

| Signal | Action Bit Position(15:0) | Comments |
|---|---|---|
| Goto_state_3 | 3 | Action to goto state 3. When there is a conflict in programming where multiple Goto_state_* actions are fired, the lowest Goto_state_* takes priority. |
| Gen_cnt_inc_0 | 4 | Increment general purpose counter 0. |
| gen_cnt_clr_0 | 5 | Clear general purpose counter 0. |
| Gen_cnt_inc_1 | 6 | Increment general purpose counter 1. |
| gen_cnt_clr_1 | 7 | Clear general purpose counter 1. |
| Gen_cnt_inc_2 | 8 | Increment general purpose counter 2. |
| gen_cnt_clr_2 | 9 | Clear general purpose counter 2. |
| Gen_cnt_inc_3 | 10 | Increment general purpose counter 3. |
| gen_cnt_clr_3 | 11 | Clear general purpose counter 3. |
| Gen_act0 | 12 | These four general actions are defined in a separate MSR. They are defined separately for each of the DSM states in order to provide flexibility. |
| Gen_act1 | 13 | |
| Gen_act2 | 14 | |
| Gen_act3 | 15 | |

The Gen_act0-3 actions are defined separately for each of the four DSM states. This allows for reasonable programming flexibility. Programming support for 6 bit general actions for four DSM states requires two registers as defined in Tables 9 and 10. Table 9 shows example dsm_act_pre_sel01 register bit field definitions, and Table 10 shows example dsm_act_pre_sel23 register bit field definitions.

TABLE 9

| Width | Bits | Access | Reset | Name | Description |
|---|---|---|---|---|---|
| 8 | 63:56 | r/w | 0x0 | Reserved_63_56 | |
| 6 | 55:50 | r/w | 0x00 | Gen_act3_state1 | General pre-select actions for state 1. |
| 6 | 49:44 | r/w | 0x00 | Gen_act2_state1 | |
| 6 | 43:38 | r/w | 0x00 | Gen_act1_state1 | |
| 6 | 37:32 | r/w | 0x00 | Gen_act0_state1 | |
| 8 | 31:24 | r/w | 0x0 | Reserved_31_24 | |
| 6 | 23:18 | r/w | 0x00 | Gen_act3_state0 | General pre-select actions for state 0. |
| 6 | 17:12 | r/w | 0x00 | Gen_act2_state0 | |
| 6 | 11:6 | r/w | 0x00 | Gen_act1_state0 | |
| 6 | 5:0 | r/w | 0x00 | Gen_act0_state0 | |

TABLE 10

| Width | Bits | Access | Reset | Name | Description |
|---|---|---|---|---|---|
| 8 | 63:56 | r/w | 0x0 | Reserved_63_56 | |
| 6 | 55:50 | r/w | 0x00 | Gen_act3_state3 | General pre-select actions for state 3. |
| 6 | 49:44 | r/w | 0x00 | Gen_act2_state3 | |
| 6 | 43:38 | r/w | 0x00 | Gen_act1_state3 | |
| 6 | 37:32 | r/w | 0x00 | Gen_act0_state3 | |
| 8 | 31:24 | r/w | 0x0 | Reserved_31_24 | |
| 6 | 23:18 | r/w | 0x00 | Gen_act3_state2 | General pre-select actions for state 2. |
| 6 | 17:12 | r/w | 0x00 | Gen_act2_state2 | |
| 6 | 11:6 | r/w | 0x00 | Gen_act1_state2 | |
| 6 | 5:0 | r/w | 0x00 | Gen_act0_state2 | |

For the pre-selected actions, 6 bits of encoding is provided to enumerate. Table 11 shows a sample list for the pre-selected actions. These actions may be outside the inner DSM timing loop and may therefore be pipelined.

TABLE 11

| Signal | Comments |
|---|---|
| Gen_cnt_tgl_inc_0 | Toggle the state bit that indicates if the corresponding counter is free counting core clocks. |
| Gen_cnt_tgl_inc_1 | |
| Gen_cnt_tgl_inc_2 | |
| Gen_cnt_tgl_inc_3 | |
| Flagout1Set | Set Flagout1 in dsm2mcode register |
| Flagout1Clear | Clear Flagout1 in dsm2mcode register |
| Flagout0Set | Set Flagout0 in dsm2mcode register |
| Flagout0Clear | Clear Flagout0 in dsm2mcode register |
| Clk_cnt_rst | Reset the clock counter. This action causes the clock counter in the DSM (dsm_clk_count) to be reset. |
| Core_stop_clk | From DSM to core clock gaters. Goes to CCL (clock control logic). |
| rand_en_toggle | Random event enable signal. Controls if the random event generator is enabled or simply held in a frozen state. |
| Trace_store_current | Store debug data to state capture buffer (L2 or TCB) cache for this cycle. |
| Trace_store_start | Start storing debug data to L2 now. Keep storing until further notice. |
| Trace_store_stop | Stop storing debug data to state capture buffer (L2 or TCB) now. |
| Time_store | Store clock count to state capture buffer (L2 or TCB) cache. |
| MceDebug1 | Cause machine check exception for cluster 1. |
| MceDebug0 | Cause machine check exception for cluster 0. |
| DbgEvent0 | Cause general purpose event, bit 0. |
| DbgEvent1 | Cause general purpose event, bit 1. |
| Patch1Set | Set the C1_Patch bit in the dsm2mcode register. This bit would get read by microcode upon a debug micro-interrupt. |
| Patch1Clear | Clear the C1_Patch bit in the dsm2mcode register. This bit would get read by microcode upon a debug micro-interrupt. |
| Cmpr1Set | Set the C1_Compare bit in the dsm2mcode register. This bit would get read by microcode upon a debug micro-interrupt. |
| Cmpr1Clear | Clear the C1_Compare bit in the dsm2mcode register. This bit would get read by microcode upon a debug micro-interrupt. |
| EnblBp1Set | Set the C1_EnableBp bit in the dsm2mcode register. This bit would get read by microcode upon a debug micro-interrupt. |
| EnblBp1Clear | Clear the C1_EnableBp bit in the dsm2mcode register. This bit would get read by microcode upon a debug micro-interrupt. |
| Patch0Set | Set the C0_Patch bit in the dsm2mcode register. This bit would get read by microcode upon a debug micro-interrupt. |
| Patch0Clear | Clear the C0_Patch bit in the dsm2mcode register. This bit would get read by microcode upon a debug micro-interrupt. |
| Cmpr0Set | Set the C0_Compare bit in the dsm2mcode register. This bit would get read by microcode upon a debug micro-interrupt. |

TABLE 11-continued

| Signal | Comments |
| --- | --- |
| C0_Cmpr0Clear | Clear the C0_Compare bit in the dsm2mcode register. This bit would get read by microcode upon a debug micro-interrupt. |
| EnblBp0Set | Set the C0_EnableBp bit in the dsm2mcode register. This bit would get read by microcode upon a debug micro-interrupt. |
| EnblBp0Clear | Clear the C0_EnableBp bit in the dsm2mcode register. This bit would get read by microcode upon a debug micro-interrupt. |
| DbgMicroInt1 | Trigger a debug micro-interrupt for cluster 1. This sets the DbMicroInt bit in the dsm2mcode register for cluster 1. This bit gets piped to the core in order to cause the debug micro-interrupt. |
| DbgMicroInt0 | Trigger a debug micro-interrupt for cluster 0. This sets the DbgMicroInt bit in the dsm2mcode register for cluster 0. This bit gets piped to the core in order to cause the debug micro-interrupt. In NB applications the DbgMicroInt bit gets ORed into the DbReq on its way to the cores. |
| DebugCrossTrigger[0] | Cross trigger to other core DSM, NB DSM, pulse BP pin etc. |
| DebugCrossTrigger[1] | Cross trigger to other core DSM, NB DSM, pulse BP pin etc. |
| DebugCrossTrigger[2] | Cross trigger to other core DSM, NB DSM, pulse BP pin etc. |
| DebugCrossTrigger[3] | Cross trigger to other core DSM, NB DSM, pulse BP pin etc. |
| EnterHdt0Set | Set the EnterHdt bit in the dsm2mcode register for cluster 0. This will cause microcode to set the DbRdy bit in the NB misc register in the NB in the event of a debug microinterrupt. |
| EnterHdt1Set | Set the EnterHdt bit in the dsm2mcode register for cluster 1. This will cause microcode to set the DbRdy bit in the NB misc register in the NB in the event of a debug microinterrupt. |
| EnterHdt0Clear | Clear the EnterHdt bit in the dsm2mcode register for cluster 0. |
| EnterHdt1Clear | Clear the EnterHdt bit in the dsm2mcode register for cluster 1. |
| StopClocks | To CK unit in Northbridge to cause a die-wide stop clocks. |
| SelfRefresh | To Northbridge to tell memory controller(s) to enter self refresh mode. |
| HTReceiveDisable | To Northbridge to tell HT PHYs to disable their receivers. This is used to prevent Northbridge corruption in the clock stopping flow. |
| EnterApml0Set | Set the EnterApml bit in the dsm2mcode register for cluster 0. This will cause microcode to set the DbRdy2 bit in the NB misc register in the NB in the event of a debug microinterrupt. |
| EnterApml1Set | Set the EnterApml bit in the dsm2mcode register for cluster 1. This will cause microcode to set the DbRdy2 bit in the NB misc register in the NB in the event of a debug microinterrupt. |

The DSM includes a plurality of registers for control and its operations. The control and status register provides miscellaneous DSM controls. For example, the control registers control the way the DSM triggers map to actions, (e.g., "generate the chip_stopclk action when PerfMon0 occurs"). Table 12 shows example dsm_control_status register bit field definitions.

TABLE 12

| Bits | Width | Access | Name | Description |
| --- | --- | --- | --- | --- |
| 63:53 | 11 | r/w | reserved | |
| 52 | 1 | r/w | DbgExtTsc | Set to a 1 in order to use an external timestamp counter (TSC) value. A 0 indicates to use the internal clock counter. In order to use an external timestamp counter it is required to set the DbgTimeCntDis bit. Otherwise the internal timestamp field will get incremented which would conflict with using that field as a mask. |
| 51 | 1 | r/w | LowPwr | Setting this bit gates-off all flop state in the DSM with the exception of the dsm_control_status register, the dsm_control_status_2 register, and the absolute time counter. This bit should never be set if the dsm_enbl bit is also set. |
| 50 | 1 | r/w | StoreToL2 | This bit controls whether currently storing debug information to the state capture buffer (L2 or TCB). |
| 49:46 | 4 | r/w | GenCntIncrement[3:0] | These bits correspond to the 4 general purpose counters. These bits are normally controlled by the actions Gen_cnt_tgl_inc_[3, 2, 1, 0]. These are to provide read access to this state. |
| 45 | 1 | r/w | DbgTimeCntDis | Disable bit for absolute time counter. This bit resets to 0, meaning that by default, the absolute time counter is enabled. |
| 44:43 | 2 | r/w | dsm_state[1:0] | These bits are the debug state machine state bits. |
| 42 | 1 | r/w | store_on_change | If one, store on change, if 0, store all. |
| 41:36 | 6 | r/w | Trig_obs_5 | MUX select for trigger observability, bit 5. Selects from all possible triggers listed in Main Trigger Selection. |
| 35:30 | 6 | r/w | Trig_obs_4 | MUX select for trigger observability, bit 4. Selects from all possible triggers listed in Main Trigger Selection. |
| 29:24 | 6 | r/w | Trig_obs_3 | MUX select for trigger observability, bit 3. Selects from all possible triggers listed in Main Trigger Selection. |
| 23:18 | 6 | r/w | Trig_obs_2 | MUX select for trigger observability, bit 2. Selects from all possible triggers listed in Main Trigger Selection. |
| 17:12 | 6 | r/w | Trig_obs_1 | MUX select for trigger observability, bit 1. Selects from all possible triggers listed in Main Trigger Selection. |
| 11:6 | 6 | r/w | Trig_obs_0 | MUX select for trigger observability, bit 0. Selects from all possible triggers listed in Main Trigger Selection. |
| 5 | 1 | r/w | bus_sel_1 | 0: select lower 32 bits from miscellaneous debug state 1: select upper 32 bits from miscellaneous debug state |
| 4 | 1 | r/w | Cmp_mode_1 | 0: compare to cmp_val[31:0] 1: compare to last state |

TABLE 12-continued

| Bits | Width | Access | Name | Description |
|---|---|---|---|---|
| 3 | 1 | r/w | bus_sel_0 | 0: select lower 32 bits from miscellaneous debug state 1: select upper 32 bits from miscellaneous debug state |
| 2 | 1 | r/w | Cmp_mode_0 | 0: compare to cmp_val[31:0] 1: compare to last state |
| 1 | 1 | r/w | Dsm_hdt_status | Indicates that the DSM attempted to invoke HDT or APML. This bit is normally intended to be read only, although it can be directly written. It gets set by the DSM and can be cleared by writing a 1 to the ClrHdtStus bit of the mcode2dsm register. |
| 0 | 1 | r/w | dsm_enbl | DSM enable. This bit should never be set if the LowPwr bit is also set. |

The dsm_enbl bit enables the operation of the DSM when set to 1, and disables the DSM operation when it is set to 0. No DSM state may be modified when the dsm_enbl bit is a 0 (except for the absolute time counter, which will count even when the DSM is turned off). The dsm_enbl bit may be reset to a 0x0. For security reasons, microcode prevents this bit from being set by the write machine status register (WRMSR) instruction, HDT (or a microcode patch) may set this bit.

The Dsm_hdt_status bit provides a way to determine the reason for entering HDT or Advanced Platform Management Link (APML). SW may poll this bit and determine if the DSM had attempted to invoke HDT or APML. This bit may be manually cleared by a write of 1 to the ClrHdtStatus bit of the Mcode2Dsm register. Although this bit is read/writable in the dsm_control_status register, writing it there has the hazard of potentially corrupting the dsm_state bits that are also writeable in that register. Having the ClrHdtStatus bit of the mcode2dsm register avoids having to do a read-modify-write (R-M-W) to dsm_control_status which could corrupt the DsmState bits which are also in dsm_control_status.

The cmp_mode and bus_sel bits are associated with the custom triggering functionality.

The trig_obs[5:0] fields control which triggers are made visible on the out-bound debug bus. The trig_obs fields may be 6 bits wide each in order to address any specific trigger. The out-bound debug bus trace data field is defined as in Table 13.

TABLE 13

| Bits | Width | Item | Description |
|---|---|---|---|
| 71:70 | 2 | DSM State | The 2 bits of DSM state. |
| 69:64 | 6 | Trig_obs[5:0] | Triggers as specified in dsm_control_status register. |
| 63:0 | 64 | Debug Bus | Contents of the debug bus. |

The store_on_change bit controls whether data is stored on every clock or when any data changes. The data that is looked at for the store-on-change feature comprises all 72 bits of trace data that is sent to the state capture buffer (L2 or TCB).

The dsm_state bits are the debug state machine state bits. DsmState bits indicate the state of the DSM itself. The DSM uses these as inputs to its logic and may also change these bits via actions.

The DbgTimeCntDis bit is for the absolute time counter. This bit resets to 0, meaning that by default, the absolute time counter is enabled.

The GenCntIncrement bits correspond to the 4 general purpose counters. These bits are normally controlled by the actions Gen_cnt_tgl_inc_[3, 2, 1, 0]. They are here in order to provide read access to this state.

The StoreToL2 bit controls whether debug information is stored to the state capture buffer (L2 or TCB). This bit is r/w accessible over the SRB. This bit may also be set and cleared via the Trace_store_start and Trace_store_stop DSM actions. The Trace_store_current and Time_store actions may cause a store even if the StoreToL2 bit is not set.

Setting the LowPwr bit statically gates-off all flop states in the DSM. However, all registers are still read/writeable. The gating controls ensure that these register flops are not clocked unless there is a write to the DSM.

The DbgExtTsc bit allows for the use of an external timestamp source. This is supported for northbridge implementations where, due to northbridge p-states changes, the clock used for the northbridge may vary in frequency over time. When this bit is set to a one, the external source is used. Additionally, when the external source is used, the internal clock counter, dsm_clk_cnt, is disabled and used as a mask value to apply to the match trigger. The reason for needing a mask value is that the external timestamp counter value may increment by more than one. Masking-off low order bits allows for not missing a specific match value that could otherwise be missed. This imposes the limitation that the resolution in matching on a clock cycle is reduced from what it would be in the simple case of the timestamp value always incrementing by one.

An absolute time counter is used for time-stamping of miscellaneous debug data as it is written into the state capture buffer (L2 or TCB). This counter may be used to create a match trigger for the DSM. Table 14 shows example dsm_clk_cnt register bit field definitions.

TABLE 14

| Width | Bits | Access | Name | Description |
|---|---|---|---|---|
| 64 | 63:0 | r/w | dsm_clk_cnt[63:0] | DSM counter value. When the bit DbgExtTsc is set to a one, this register does not increment and is used as a mask with the dsm_clk_match register. |

The dsm_clk_cnt register may be reset by the DSM when the action signal clk_cnt_rst fires. The signal that performs this reset is another possible DSM action. This allows setting up a delay function for the DSM. It is expected that in most cases this counter would not get reset by the DSM and that creating delays would be performed using the four general purpose counters.

Due to northbridge P-states, the northbridge DSM applications may provide an "NB P-states adjusted" clock counter that may be used by the DSM in place of this internal counter. Table 15 shows an example dsm_clk_match register bit field definitions.

TABLE 15

| Width | Bits | Access | Name | Description |
|---|---|---|---|---|
| 64 | 63:0 | r/w | dsm_clk_match[63:0] | DSM counter match value minus one. By writing one less than the desired match value it allows the hardware to pre-compute the match in advance, without having to do the subtraction on it's own. |

The dsm_clk_match register may be used to specify an event that occurs when the value in this register is equal to one less than the value in the dsm_count register. Upon a match, a signal trig_clk_cnt pulses. When the DbgExtTsc is set to a one, the match condition looks at the bits where the corresponding bits in the dsm_clk_cnt register are set to 0.

General purpose counters may be controlled by the DSM. They may be reset or incremented by the DSM. They increment when the DSM fires a corresponding increment signal. They increment on each clock if the corresponding increment state is true (e.g., GenCntIncrement[3:0] are controlled by Gen_cnt_tgl_inc__[3:0] actions). They may create match triggers for the DSM. In conjunction with an associated match register, they may be used by the DSM as a trigger source.

When in a loop-back mode, general purpose counters 0 and 1 become the data source for the debug bus. In the loop-back mode, general purpose counter 0 may feed the lower 32 bits of the debug bus and general purpose counter 1 may feed the upper 32 bits of the debug bus.

In order to implement the counters in a way that meets timing and does not consume additional circuit area, these counters may have the following limitations. The counters may start to count from 0x0, and may support any possible match limit. A rollover with a match limit less than 3 may not be supported. Starting to count from a non-zero value may work if the match is greater than or equal to the start value plus 3. A match limit of 0x0 may not be supported. An increment action may take priority over a clear action even if the increment was caused by a gen_cnt_toggle_inc_*. A clear action may not have an effect if it is done the same cycle as a toggle action (where the toggle goes from increment to not increment). This is because the toggle action is delayed by a state. However, to get the same overall effect, the user may put the clear action in the same action field of the meta-vector where it toggles back to increment (when it toggles to increment from not increment). Here, due to the delayed effect of the toggle, the clear would really happen before the toggle.

Table 16 shows example dsm_gen_cnt_* register bit field definitions.

TABLE 16

| Width | Bits | Access | Name | Description |
|---|---|---|---|---|
| 32 | 63:32 | r/w | dsm_gen_match_*[31:0] | DSM counter match value |
| 32 | 31:0 | r/w | dsm_gen_cnt_*[31:0] | DSM counter value |

The dsm_gen_cnt_* register increments on clock cycles that the corresponding trigger signal gen_clk_inc_* is true or on clock cycles where the corresponding Gen_cnt_tgl_inc_* action has caused the counter to keep incrementing. This register may be reset as an action of the DSM when the corresponding action signal gen_clk_rst_* is true. The reset function may take priority over the increment function in a conflict case. This allows setting up a delay function for the DSM.

The debug block may have a pseudo-random event generator, whose output may be used as a trigger. In accordance with one embodiment, the pseudo-random event generator may comprise two virtual linear feedback shift registers (LFSRs). For example, the LFSRs may have the flowing attributes: 48 bit wide, fully programmable feedback polynomial (47 bit value), Galois style math (can meet timing, independent of width), two sets of mask/match registers for two virtual LFSRs (actual LFSR shared), 48 bit mask resisters, and 48 bit match registers.

Figure 6:
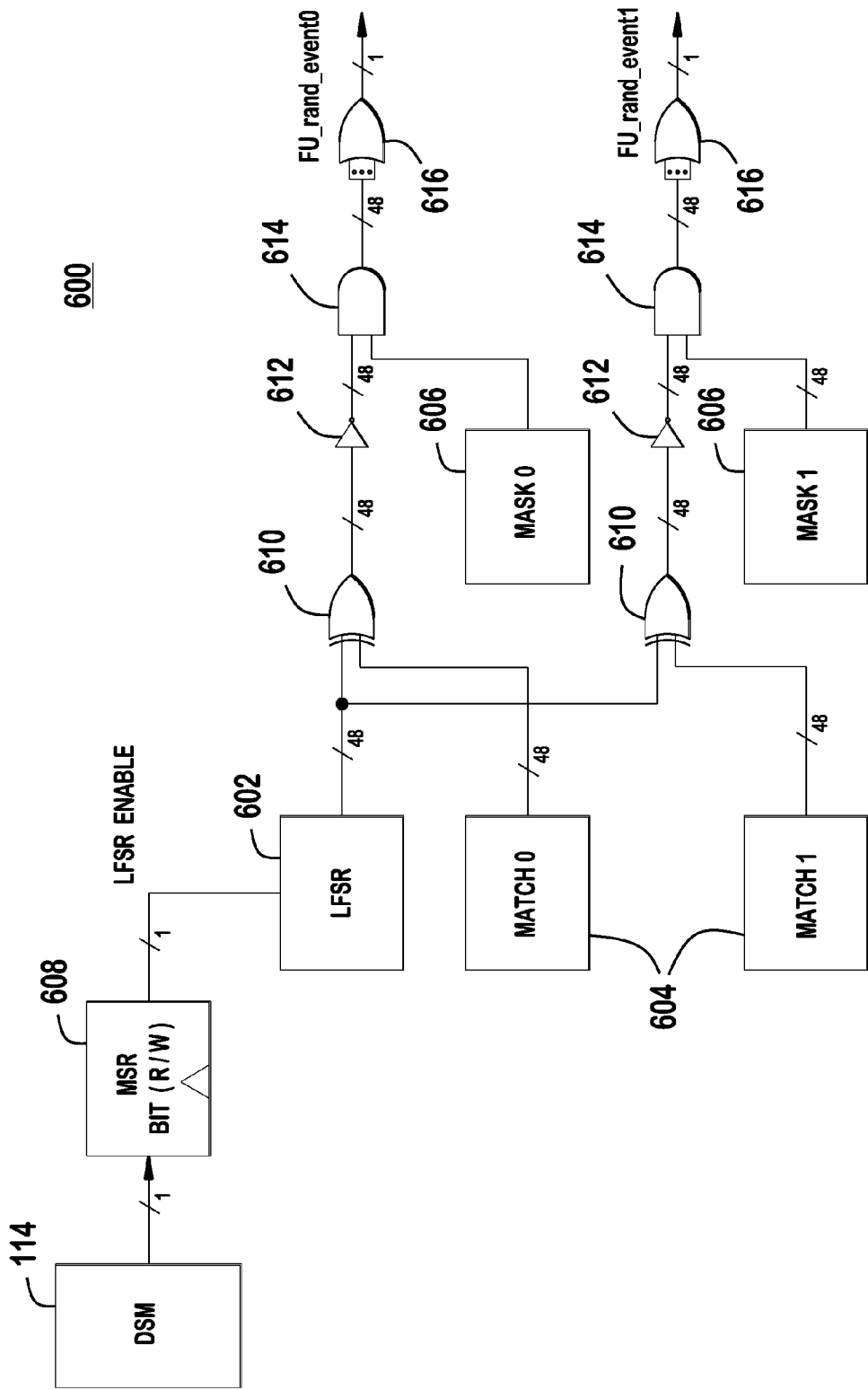
FIG. 6 shows a logical structure of an example random event generator.

FIG. 6 shows a logical structure of an example random event generator 600. The output of the random event generator 600 may be used as a trigger source for the DSM. Two output bits (rand_event0 and rand_event1) are generated in this example. It may also be used by other units within the core to inject errors in order to test error handling mechanisms. Because this mechanism is built into the hardware, it may be used both pre- and post-silicon.

The random event generator 600 includes a random event generator register 602 (dsm_rnd_lfsr), a random event generator feedback register 608 (dsm_rnd_poly), match registers 604 (dsm_rnd_match), mask registers 606 (dsm_rnd_mask), XOR gates 610, NOT gates 612, AND gates 614, and OR gates 616.

The DSM 114 may issue a rand_en_toggle action to enable or disable the random event generator 600 by setting the Dsm_rnd_enbl bit in the random event generator feedback register 608. A seed value may be applied by writing it into the random event generator register 602. The random event feedback register 608 stores the random event generator feedback polynomial. The random event generator feedback polynomial allows for using any possible polynomial within the random event generator 600. M-series or maximal length polynomials may be used in order to have the most random behavior. The random event generator feedback register 608 may be a Galois style LFSR. One example polynomial to use is [48, 28, 27, 1]g. This translates to 0x0000_0C00_0001. The bit positions of the feedback terms are shifted to the right by one. The 0-th order term is there and is implied. The highest order term (48) is listed in order to show the order.

The dsm_rnd_match register 604 holds a random event generator match value, and the dsm_rnd_mask register 606 holds a random event generator mask value. The final output of the random event generator 600 is a single bit (rand_event0 or rand_event1) that represents the resultant random event. In order to generate the output bit, the XOR gate 610 performs a bit-wise comparison of the random event generator match value (reg_match[47:0]) and the LFSR value (reg_lfsr[47:0]). The XOR gate outputs are then inverted by the NOT gates 612, and then masked with the random event generator mask value by the AND gate 614. The bits corresponding bits that are a '0' in the random event generator mask register 606 (reg_mask[47:0]) are masked off. The output bit is then generated by performing an OR operation on the masked values by the OR gate 616.

Table 17 shows example dsm_rnd_lfsr register bit field definitions. This is the actual LFSR register. A seed value may be applied writing this register.

TABLE 17

| Width | Bits | Access | Name | Description |
|---|---|---|---|---|
| 16 | 63:48 | r/w | Reserved | |
| 48 | 47:0 | r/w | dsm_rnd_lfsr[47:0] | Random event generator LFSR value. |

Table 18 shows example dsm_rnd_poly register bit field definitions.

TABLE 18

| Width | Bits | Access | Reset | Name | Description |
|---|---|---|---|---|---|
| 16 | 63:48 | r/w | 0 | Reserved | Reserved bit |
| 1 | 47 | r/w | 0 | Dsm_rnd_enbl | Bit to control whether random event generator is active. Can also be toggled by an action from the DSM. |
| 47 | 46:0 | r/w | 0x0000_0C00_0001 | dsm_rnd_poly[46:0] | Random event generator feedback polynomial |

Miscellaneous debug data may be stored in an on-chip or off-chip storage structure, (e.g., cache 108 or TCB 124) in order to make it visible for debug. The debug data may be funneled into the DSM via a debug bus network that may pull debug data from a variety of locations.

Figure 7:
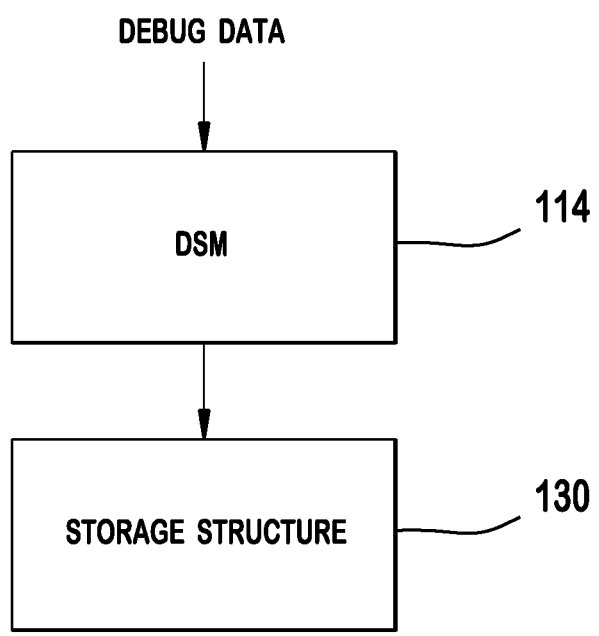
FIG. 7 shows the logical structure of the debug bus and store-to-buffer flow through the DSM.

FIG. 7 shows the logical structure of the debug bus and store-to-buffer flow through the DSM 114. Debug data is collected from the various units and fed to the DSM 114. The DSM 114 passes the debug data (state capture data) to the storage structure 130 (e.g., an L2 cache, a TCB, or a data storage in a core, a northbridge, a southbridge, a graphics processing unit (GPU), a central processing unit (CPU), or off-chip, or the like). The DSM 114 may conditionally store the debug data in order to provide a filtering function. The tracing may be started and stopped under the control of the DSM 114. After the debug data is captured in the storage structure 130, it may be accessed from the HDT via the SRB.

The storage structure 130 employed for this purpose may include using de-featured ways of the L2 cache and the TCB. Table 19 shows example state capture data bit field definitions. The DebugTraceWrEn bit indicates if that entry contains valid information or not. The count/data bit indicates if bits 71:0 represent a timestamp value or actual debug data.

TABLE 19

| | Bit Field | | | |
|---|---|---|---|---|
| 73 DbgWrEn | 72 Count/ Data | 71:70 | 69:64 | 63:0 |
| Contents 0 | reserved | reserved | reserved | reserved |
| 1 | 0 | DSM State | Trig_obs[5:0] | Debug Bus Data |
| | 1 | | reserved | Timestamp Value (64 b) |

The trace data (state capture data) may be stored every clock cycle while the StoreToL2 bit in the dsm_control_status register is set. Although the StoreToL2 bit is read/writable in the dsm_control_status register, this may be done via the trace start and stop actions from the DSM.

In order to provide filtering, a store-on-change mode may be provided. The store-on-change mode is entered by setting the StoreToL2 bit (e.g., via the Trace_store_start and Trace_store_stop actions) and the store_on_change bit in the dsm_control_status register. In the store-on-change mode, store values for the entire store stream from one cycle are compared to the next. This comparison applies to the entire bits of the debug data in the store-to path. If there is no change, a new value is not stored. If there is a change, it is stored.

A filter function may be defined by the trigger generation logic. This mode may provide a filter ratio that is dependent on the choice of trigger conditions and the data stream. Several different modes may be provided. For example, in one mode, an action (Trace_store_current) may be defined to store the selected debug data to the state capture buffer (L2 or TCB) on the current cycle. In another mode, actions (Trace_store_start and Trace_store_stop) may be defined to start and stop storing. A companion action may be defined to stop the storing. "Store on trigger" is actually not an explicit mode but rather involves using the Trace_store_current or the Trace_store_start and Trace_store_stop actions along with the programming of the DSM to selectively store.

A condition may be set-up where the Trace_store_current action would fire at certain times. The less frequently it fired, the higher the compression ratio. In the case of using the Trace_store_start and Trace_store_stop actions, the DSM may be setup to fire the Trace_store_start followed by firing the Trace_store_stop action. The overall compression ratio would be a function of the time between the Trace_store_start and Trace_store_stop actions versus the total time. The store-on-change mode may be combined with the use of the Trace_store_start and Trace_store_stop actions in order to further optimize the compression ratio.

Upon any transition from storing to not storing, a timestamp value may be written out. This allows correlation of the filtered data.

To provide flexibility on the debug bus a bit-wise programmable delay function may be provided through the dsm_dbg_delay register MSR. Each of the 64 bits of the debug bus may be delayed by one clock cycle to handle the cases where a valid bit is arriving 1 cycle after its corresponding data. Although it is desirable to have any valid bits pipe-aligned with the corresponding data, it would be inefficient to delay the data at the source. Therefore, providing this capability centrally at the DSM may be more efficient. For each bit in the dsm_dbg_delay register that is a 1, the corresponding bit on the debug bus will be delayed by one clock.

The dsm_dbg_mask register is a bit-wise debug bus mask. For each bit in the dsm_dbg_mask register, if it is a 0, the corresponding debug bus bit is not masked. If it is a 1, the corresponding debug bus bit is masked. This function may be used in applications where there is no way to perform this masking external to the DSM and there is a desire to use the store-on-change function or the DbgBusChng trigger.

The DSM may trigger based on the miscellaneous debug bus data. The debug bus data may be processed for any logical operations for generating a trigger. For example, the logical operation may be "equal to" comparison and/or "greater than" comparison. Among the 64 bits of debug bus data, 32 bits may be selected by the bus_sel signal in the control and status register. Certain debug data bit or bits may be selected for the comparison by the mask (scb_trig_mask bits). Two modes may be defined by the cmp_mode bit ("compare to last value" mode and "compare to a fixed value" mode). In the "compare to last value" mode, the debug data is compared to the last debug data. In the "compare to a fixed value" mode, the debug data is compared to the given compare value (cmp_val bits). Table 20 shows example dsm_trig_data_* register bit field definitions. The dsm_trig_data_* register is associated with the triggers trig_misc_eq[*] and trig_misc_gt[*].

TABLE 20

| Width | Bit(s) | Access | Name | Description |
| --- | --- | --- | --- | --- |
| 32 | 63:32 | r/w | Cmp_val[31:0] | Debug data comparison value |
| 32 | 31:0 | r/w | Scb_trig_mask[31:0] | Debug data mask value. A 0 means masked. A 1 means not masked. |

The bits that control this functionality reside in the register dsm_control_status. If the Bus_sel__0 bit is set to 0, lower 32 bits are selected from miscellaneous debug bus data, and if it is set to 1, upper 32 bits are selected from miscellaneous debug bus data. If Cmp_mode__0 bit is 0, it is compared to cmp_val[31:0], and if the Cmp_mode__0 bit is 1, it is compared to the last state. Several triggers based on the debug bus may be provided. Each one of these triggers may be programmed to come from any of the 64 bits on the debug bus. Table 21 shows example dsm_trig_sel register bit field definitions.

TABLE 21

| Width | Bit(s) | Access | Name | Description |
| --- | --- | --- | --- | --- |
| 16 | 63:32 | r/w | Reserved | Reserved Bits |
| 2 | 31:30 | r/w | TriggerMode3 | 2'b0x: Normal behavior 2'b11: |
| 2 | 29:28 | r/w | TriggerMode2 | Edge detect - posedge 2'b10: |
| 2 | 27:26 | r/w | TriggerMode1 | Edge detect - negedge |
| 2 | 25:24 | r/w | TriggerMode0 | |
| 6 | 23:18 | r/w | TriggerSelect3 | Select value for trigger 3 (BitTrig3). |
| 6 | 17:12 | r/w | TriggerSelect2 | Select value for trigger 2 (BitTrig2). |
| 6 | 11:6 | r/w | TriggerSelect1 | Select value for trigger 1 (BitTrig1). |
| 6 | 5:0 | r/w | TriggerSelect0 | Select value for trigger 0 (BitTrig0). |

The 6 bit value in each TriggerSelect* field points to any of the 64 bits on the debug bus. The 2 bit TriggerMode* values correspond to each TriggerSelect* field. The TriggerMode* values allow making the associated triggers behave as a positive-edge or negative-edge edge detect. This feature is intended to support more effective validation.

Table 22 shows example dsm_sm_vec register bit field definitions.

TABLE 22

| Width | Bit(s) | Access | Name | Description |
| --- | --- | --- | --- | --- |
| 22 | 63:42 | r/w | Reserved | Reserved Bits |
| 6 | 41:36 | r/w | C | Encoding for trigger condition C |
| 6 | 35:30 | r/w | B | Encoding for trigger condition B |
| 6 | 29:24 | r/w | A | Encoding for trigger condition A |
| 8 | 23:16 | r/w | Permutations | Permutation select for 8 cases. |
| 16 | 15:0 | r/w | Action | Action selection |

DSM to microcode interface for the DSM is explained hereafter. An interface may be provided for the DSM to communicate with the microcode, and vice versa. This interface may allow for bidirectional communication between the DSM and the microcode. The dsm2mcode register provides a means for the DSM to signal commands to the microcode, and the mcode2dsm register provides a means for the microcode to signal the DSM. The DSM actions may set bits in the dsm2mcode register which are readable by the microcode. Microcode may set bits in the mcode2dsm register which are usable as triggers by the DSM.

A dedicated debug micro-interrupt allows the DSM to get the microcode's attention. These features provide the ability for the DSM to control when breakpoints are actually taken or not, the ability for the DSM to fire off a microcode patch, the ability for the DSM to direct the microcode to perform a general purpose comparison (like conditional HDT) and return a true or false result, the ability for the DSM to direct the microcode to enter HDT, the ability for the microcode to signal breakpoints to the DSM, and the ability for the microcode to set a general purpose flag bit to the DSM, or the like.

Both the dsm2mcode and the mcode2dsm registers may be handled in a threaded manner such that the microcode running on a given thread will interact with a separate state from that of the other thread. The debug micro-interrupt may be treated like any other interrupt (other than an emergency HDT interrupt), and may be taken at an instruction boundary. There are a few cases that it may be taken in the middle of an instruction or routine. Most of these cases are spin-loops, for example, HALT, STPCLK, FPU FREEZE loop, etc.

Table 23 shows example dsm2mcode register bit field definitions.

TABLE 23

| Width | Bit(s) | Access | Name | Description |
| --- | --- | --- | --- | --- |
| 45 | 63:20 | r/w | Reserved | |
| 1 | 19 | r/w | EnterApml | Instructs microcode to cause entry to enter APML. This bit is cleared by microcode before it returns to the x86 instruction stream. If this bit and the EnterHdt bit are both set, the EnterHdt bit should have priority. |
| 1 | 18 | r/w | DbgMicroInt | State bit to indicate a debug micro-interrupt has been invoked by the DSM. When microcode services this interrupt it needs to clear this bit via a write of one to the |

TABLE 23-continued

| Width | Bit(s) | Access | Name | Description |
|---|---|---|---|---|
| | | | | ClrDbgMicroInt bit of the mcode2dsm register. It should NOT write this bit through the dsm2mcode register. |
| 1 | 17 | r/w | EnterHdt | Instructs microcode to write the ClrEnterHdt bit in the Mcode2dsm register, then enter PDM. Entering PDM will then cause a write the DbRdy bit of the Northbridge Miscellaneous register to cause the rest of the cores in the system to enter HDT. This bit is cleared by microcode before it returns to the x86 instruction stream. |
| 1 | 16 | r/w | FlagOut | Flags settable by DSM actions to provide generic signaling from DSM to microcode or HDT. |
| 1 | 15 | r/w | Patch | Execute microcode patch. This bit is cleared by microcode before it returns to the x86 instruction stream. |
| 1 | 14 | r/w | Compare | Perform comparison similar to conditional HDT and return a true or a false result in the Ucode_cmp_true or Ucode_cmp_false bits of the Mcode2Dsm MSR. |
| 1 | 13 | r/w | EnableBp | Upon taking a debug micro-interrupt, if this bit is set, write bits in DR7 and MCODE_CTL as per below. This bit is cleared by microcode before it returns to the x86 instruction stream. |
| 2 | 12:11 | r/w | McodeCtl | Upon a debug micro-interrupt these bits are loaded into MCODE_CTL[9:8] if the EnableBp bit is set. This action is a read-modify-write to MCODE_CTL[9:8] from microcode. |
| 11 | 10:0 | r/w | DbgCntrl | Upon a debug micro-interrupt bits 9:0 are loaded into DR7[9:0] and bit 10 is loaded into DR7[13] if the EnableBp bit is set. This action is a read-modify-write to DR7[9:0] from microcode. |

In order to use breakpoints conditions to trigger the DSM it may be observed when the breakpoint condition was observed without actually taking it. The EnableBp bit is to indicate to the microcode to update values in a register. This allows for being able to begin a debug sequence with breakpoints disabled and to enable them along the way (or visa versa). This scheme leverages the exiting breakpoint enable/disable mechanisms.

The flag1 and flag0 bits may be set and cleared by DSM actions or SRB accesses. These bits are trigger options to the DSM. These bits may be used in a variety of ways. They may be extra state bits for the DSM to track complex conditions with. They may be used to signal information from the DSM observations to a microcode path which reads the bits. They may be set by HDT to inform the DSM of some HDT-level observation.

The DSM may the ability to trigger the microcode by pulling a dedicated debug micro-interrupt. Microcode prioritizes the DSM micro-interrupt as the next higher priority from the conventional debug request (DBREQ) interrupt. Hence, if both DBREQ and the DSM interrupt are pending, the microcode may process the DSM interrupt first. The Patch, Compare, EnableBp, EnterApml and EnterHdt bits all have an associated set and clear action from the DSM. This allows these bits to be dynamically changed by the DSM. The McodeCtl and DbgCntrl bits do not have any set or clear actions and may only be controlled by writing them over the SRB. The McodeCtl and DbgCntrl bits may be statically written while setting up the debug run. The Patch, Compare, EnableBp, EnterApml and EnterHdt bits may then be dynamically set or cleared by the DSM leading up to firing the micro-interrupt action (CU_DbgMicroIntC[1|0]). This allows the DSM to change what it "tells" the microcode to do differently from one debug interrupt to another. When the debug micro-interrupt is fired, the microcode reads the dsm2mcode register in order to determine what it needs to do.

The bit clearing of DbgMicroInt and Patch, EnableBp, EnterApml and EnterHdt bits in dsm2mcode are handled with clear bits in the mcode2dsm register. This scheme is implemented instead of a R-M-W directly to the dsm2mcode register in order to prevent the possibility of other bits in the dsm2mcode register that have been modified by the DSM (since the read) from being overwritten.

If a DSM is employed in the northbridge (NB), since the DSM in the NB does not have a complete microcode interface, rather than firing the debug interrupt, the NB DSM may perform OR operation on their DbgInt output into the DBReq signal, before it fans-out to all the cores. This allows for supporting the NB DSM causing an entry to HDT, without any change to the CCI.

Of the bits in the Dsm2mcode register, the DbgMicroInt and FlagOut bits may be supported. The DbgMicroInt drives the DbgInt output. The FlagOut bit may be used as scratchpad, just like in the core DSMs. The EnableBp, Compare, Patch, EnterApml and EnterHdt bits may not be utilized.

If the DSM lacks the resources to handle a very complicated triggering sequence, it is possible to employ a microcode to extend the capabilities. At any point in a triggering sequence, the DSM may invoke a microcode patch that completely reconfigures the DSM for an entirely new trigger sequence. This may be employed to handle cases of high complexity. DSM_PATCH may be in a read-only memory (ROM) as a return from interrupt. It may be patched via the microcode patch mechanism. This special location should not be shared with other instruction flows.

All interrupts (int 0, int 1, int 3, etc.) will set bit 0 in mcode2dsm, with some exceptions. First, only the one-byte int3 opcode sets the INT3 bit in mcode2dsm, and the one-byte int3 does not set the INT bit. Software debuggers may use the one-byte int3 opcode to set software breakpoints, which is why int3 has a special interface to the DSM and why the one-byte opcode is important to flag. Secondly, 'int 4' (overflow) will not set bit 0 in mcode2dsm because this interrupt is rarely used and the change to microcode would not be easy. In the rare case that a breakpoint needs to be set for 'int 4', users may set an instruction breakpoint at the start of the interrupt handler. Other appropriate interrupt handlers may set bits 8:3 in mcode2dsm if the dsm_enbl bit is set in the DSM Control-Status register (bit 0).

The mcode2dsm MSR provides a means for the microcode to signal the DSM. There are separate bits for each cluster. Table 24 shows example mcode2dsm register bit field definitions. All bits are write-only.

TABLE 24

| Width | Bit(s) | Name | Description |
|---|---|---|---|
| 1 | 63:37 | reserved | |
| 1 | 36 | RedirApml | Used by microcode to signal a redirect to the NB in APML mode. Would not be supported in an NB DSM instance. |
| 1 | 35 | ClrEnterApml | If this bit is written to a 1, the EnterApml bit of the dsm2mcode register is cleared. Would not be supported in an NB DSM instance. |
| 1 | 34 | ClrFlagOut | If this bit is written to a 1, the FlagOut bit of the dsm2mcode register is cleared. This is provided for use in a possible patch and microcode does not use this by default. |
| 1 | 33 | SetFlagOut | If this bit is written to a 1, the FlagOut bit of the dsm2mcode register is set. This is provided for use in a possible patch and microcode does not use this by default. |
| 1 | 32 | ClrDbgMicroInt | If this bit is written to a 1, the DbgMicroInt bit of the dsm2mcode register is cleared. This bit is not intended to be written from the microcode that handles debug interrupts. |
| 1 | 31 | FLAGIN | General purpose flag for patches or HDT interfacing. This is provided for use in a possible patch and microcode does not use this by default. |
| 1 | 30 | DBREQ2 | Set when thread enters micro interrupt handler for INT_DBREQ2. |
| 1 | 29 | ICIBS | Set when thread enters micro interrupt handler for INT_ICIBS. |
| 1 | 28 | ClrHdtStatus | If this bit is written to a 1, the hdt_status bit of the dsm_control_status register is cleared. Having this avoids having to do a R-M-W to dsm_control_status which could corrupt the dsm_state bits which are also in dsm_control_status. This bit is intended to be written by HDT software and not by microcode. |
| 1 | 27 | VINTR | Set when thread enters micro interrupt handler for INT_VINT. |
| 1 | 26 | A20MASK | Set when thread enters micro interrupt handler for INT_A20MASK. |

TABLE 24-continued

| Width | Bit(s) | Name | Description |
|---|---|---|---|
| 1 | 25 | STDATDBG | Set when thread enters micro interrupt handler for INT_STDATDBG. |
| 1 | 24 | STARTUP | Set when thread enters micro interrupt handler for INT_STARTUP. |
| 1 | 23 | DBREQ | Set when thread enters micro interrupt handler for INT_DBREQ. |
| 1 | 22 | MACHCHK | Set when thread enters micro interrupt handler for INT_MACHCHK. |
| 1 | 21 | NSSBSS | Set when thread enters micro interrupt handler for normal single step & branch single step |
| 1 | 20 | SMI | Set when thread enters micro interrupt handler for INT_SMI. |
| 1 | 19 | INIT | Set when thread enters micro interrupt handler for INT_INIT. |
| 1 | 18 | NMI | Set when thread enters micro interrupt handler for INT_NMI. |
| 1 | 17 | INTR | Set when thread enters micro interrupt handler for INT_INTR. |
| 1 | 16 | STPCLK | Set when thread enters micro interrupt handler for INT_STPCLK. |
| 1 | 15 | STARTCLK | Set when thread enters micro interrupt handler for INT_STARTCLK. |
| 1 | 14 | UcodeCmpFalse | Bit that indicates that the microcode comparison returned a false for thread. Writing this bit to a 1 will also cause the HW to clear the Compare bit in the dsm2mcode register. |
| 1 | 13 | UcodeCmpTrue | Bit that indicates that the microcode comparison returned a true for thread. Writing this bit to a 1 will also cause the HW to clear the Compare bit in the dsm2mcode register. |
| 1 | 12 | ClrPatch | If this bit is written to a 1, the Patch bit of the dsm2mcode register is cleared. |
| 1 | 11 | ClrEnblBp | If this bit is written to a 1, the EnableBp bit of the dsm2mcode register is cleared. |
| 1 | 10 | FteOpcode1 | Indicates that opcode 1 of thread matches for the fast trap and emulate feature. |
| 1 | 9 | FteOpcode0 | Indicates that opcode 0 of thread matches for the fast trap and emulate feature. |
| 1 | 8 | BpVmExit | VMEXIT breakpoint for thread. |
| 1 | 7 | BpGenDet | General detect breakpoint for thread. |
| 1 | 6 | BpTaskSw | Task switch breakpoint for cluster 0. |
| 1 | 5 | BpCpuId | CPU ID breakpoint for thread. |
| 1 | 4 | BpWrMsr | WRMSR breakpoint for thread. |
| 1 | 3 | BpExcpBp | Exception breakpoint for thread. |
| 1 | 2 | int3 | Int 3 interrupt for thread. Set upon int3 opcode only. |
| 1 | 1 | ClrEnterHdt | If this bit is written to a 1, the EnterHdt bit of the dsm2mcode register is cleared. |
| 1 | 0 | int | Int SW interrupt for thread. Set upon intn, with n = 3. |

The bits in the mcode2dsm MSR are used for the microcode to signal the DSM. These bits get routed to the DSM as triggers that the DSM may use like any other trigger. There may be two sets of these bits, one for each thread. These bits may be written by the microcode before any exception, including an SVM intercept check. The way that the software-based interrupts (int, int3) are signaled to the DSM is by the microcode writing these corresponding bits in the mcode2dsm register.

Although features and elements are described above in particular combinations, each feature or element may be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data (e.g., netlists, GDS data, or the like) that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. An integrated circuit (IC) comprising:
a module configured to receive debug triggers and initiate a programmed action on a condition that a corresponding debug trigger or a sequence of debug triggers occurs, wherein the programmed action is one of a main action that feeds back to the module and a pre-selected action that is pipelined.

2. The IC of claim 1 wherein the module is configured to receive debug triggers from at least one of a processor core, a different debugging module, a northbridge, or other sockets.

3. The IC of claim 1 wherein the module is configured to trigger at least one of stopping a clock, entering a debug mode, issuing a debug cross trigger, starting or stopping storing debug trace data to a storage structure, transitioning a debug state, incrementing, decrementing, or clearing a counter, or setting or clearing a flag in a register.

4. The IC of claim 1 wherein the module includes a register for holding a meta-vector, the meta-vector including trigger fields for selecting debug triggers, a permutation field for combining a Boolean combination of the selected debug triggers, and an action field, such that an action defined by the action field is triggered on a condition that a condition defined by the permutation field is met.

5. The IC of claim 1 wherein the debug triggers include at least one of a count match trigger which is generated when a counter matches a match value, a clock count match trigger which is generated when a clock count matches a match value, a flag bit in a register for communication between the module and microcode, a random event signal generated by a random event generator, a performance monitor signal, an interrupt, an error, a breakpoint, a debug data-based trigger that is generated based on logical or arithmetic comparison of data on a debug bus, and a debug data-based trigger which is a bit selected from a debug bus.

6. The IC of claim 1 wherein the debug triggers are generated by a microcode.

7. The IC of claim 1 wherein the module is configured to receive debug data and feed it to a storage structure.

8. The IC of claim 7 wherein the storage structure is a cache on the IC or a data storage in a core, a northbridge, a southbridge, a graphics processing unit (GPU), a central processing unit (CPU), or off-chip.

9. The IC of claim 7 wherein the module is configured to perform a filter function on the debug data.

10. The IC of claim 1 wherein the module includes a control and status register to control operations of the module.

11. The IC of claim 10 wherein the control and status register includes a low power bit for controlling a power state of the module to save power consumption.

12. A method of debugging an integrated circuit (IC), the method comprising:
receiving debug triggers; and
initiating a programmed action on a condition that a corresponding debug trigger or a sequence of debug triggers occurs, wherein the programmed action is one of a main action that feeds back to the module and a pre-selected action that is pipelined.

13. The method of claim 12 wherein the debug triggers are received from at least one of a processor core, a different debugging module, a northbridge, or other sockets.

14. The method of claim 12 wherein the programmed action includes at least one of stopping a clock, entering a debug mode, issuing a debug cross trigger, starting or stopping storing debug trace data to a storage structure, transitioning a debug state, incrementing, decrementing, or clearing a counter, or setting or clearing a flag in a register.

15. The method of claim 12 wherein the debug triggers include at least one of a count match trigger which is generated when a counter matches a match value, a clock count match trigger which is generated when a clock count matches a match value, a flag bit in a register for communication between the module and microcode, a random event signal generated by a random event generator, a performance monitor signal, an interrupt, an error, a breakpoint, a debug data-based trigger that is generated based on logical or arithmetic comparison of data on a debug bus, and a debug data-based trigger which is a bit selected from a debug bus.

16. The method of claim 12 wherein the debug triggers are generated by a microcode.

17. The method of claim 12 further comprising:
storing debug data in a storage structure.

18. The method of claim 17 further comprising:
performing a filter function on the debug data before storing the debug data.

19. A non-transitory computer-readable storage medium storing a code for describing a structure and/or a behavior of a module configured to receive debug triggers and initiate a programmed action on a condition that a corresponding debug trigger or a sequence of debug triggers occurs, wherein the programmed action is one of a main action that feeds back to the module and a pre-selected action that is pipelined.

20. The computer-readable storage medium of claim 19 wherein the code is written in a hardware description language (HDL).

* * * * *